No. 646,274. Patented Mar. 27, 1900.
H. S. FIRESTONE.
VEHICLE TIRE.
(Application filed Nov. 20, 1899.)

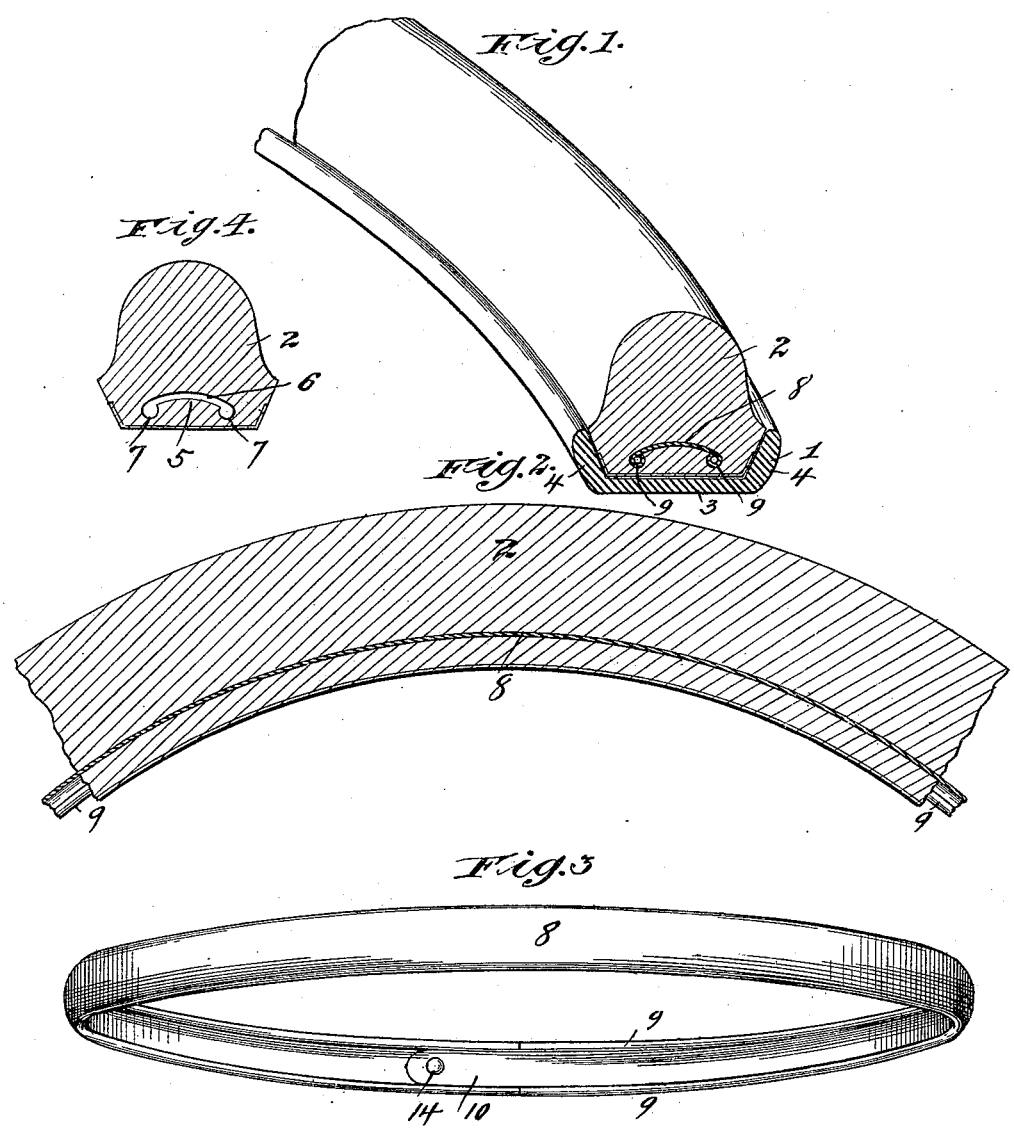

(No Model.) 2 Sheets—Sheet 2.

Witnesses, Inventor,
Harvey S. Firestone,
By Offield, Towle & Linthicum,
Atty's.

UNITED STATES PATENT OFFICE.

HARVEY S. FIRESTONE, OF CHICAGO, ILLINOIS.

VEHICLE-TIRE.

SPECIFICATION forming part of Letters Patent No. 646,274, dated March 27, 1900.

Application filed November 20, 1899. Serial No. 737,586. (No model.)

*To all whom it may concern:*

Be it known that I, HARVEY S. FIRESTONE, of Chicago, in the county of Cook and State of Illinois, have invented certain new and useful Improvements in Vehicle-Tires, of which the following is a specification.

This invention relates to vehicle-tires, and has for its object to provide a tire having an elastic tread of superior durability, being less liable to cut than such tires are as usually constructed and being adapted to be readily and permanently secured in place in the rim of the wheel.

To these ends the invention consists in certain novel features which I will now proceed to describe and will then particularly point out in the claims.

Figure 5:
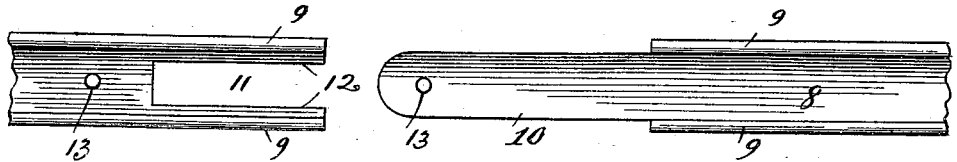
Figure 6:
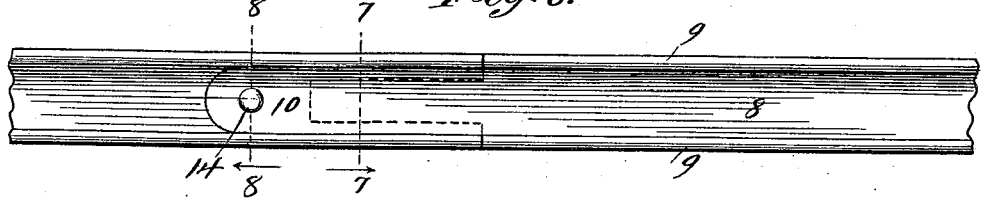
Figure 7:
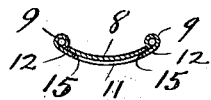
Figure 8:
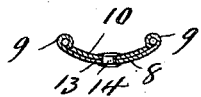

In the accompanying drawings, Figure 1 is a perspective view, partly in section, of a tire embodying my invention. Fig. 2 is a longitudinal sectional view of a portion of the tire proper detached. Fig. 3 is a perspective view of the tire-retaining device detached. Fig. 4 is a transverse sectional view of the rubber tire detached and with the fastening device removed. Fig. 5 is a plan view of the ends of the retaining device before they are joined. Fig. 6 is a similar view showing the ends joined. Fig. 7 is a transverse sectional view taken on the line 7 7 of Fig. 5 and looking in the direction of the arrow. Fig. 8 is a sectional view taken on the line 8 8 of Fig. 5 and looking in the direction of the arrow.

In the said drawings, 1 indicates the metallic rim in which the tire proper, 2, is seated, said rim comprising a flat base 3 and outwardly-extending diverging flanges 4, thereby forming a channel or groove. The tire 2 is constructed of rubber or other like material, its inner portion being shaped to conform to the groove or channel of the metallic rim, while its outer portion, lying outward beyond the metallic rim, may be given any suitable conformation—such, for instance, as that shown. This tire proper is made in the form of a strip of rubber, which is afterward seated in the circular rim, it being of such length that its ends will meet when the rubber is compressed longitudinally in the rim. Throughout the inner portion of said tire proper—to wit, that portion which lies within the channel of the rim—there is formed a longitudinal passage 5, comprising a central arched or curved portion 6, most distant from the base of the tire at its center and approaching said base at its ends, and enlarged tubular portions 7, located at said ends. In conjunction with the tire thus constructed I employ a retaining device 8, consisting of a metallic strip or band, which is continuous or smooth on both its inner and outer surfaces, except at its ends, and has its body portion curved or arched transversely in the same manner as the body portions of the passage 5 is arched or curved. The longitudinal edges of this strip or band are turned or rolled inward to form beads or enlargements 9, which fit within the tubular portions 7 of the longitudinal passage 5 in the tire. In order to firmly unite the ends of this retaining device I employ the following construction: At the end of the strip or band the ribs or beads 9 are cut away for some distance back, as indicated in Fig. 4, leaving a tongue 10 of about the width of the body portion of the strip or band. The other end of the strip or band is centrally cut away, as indicated at 11, leaving lateral flanges or seats 12 between the enlarged margins or beads 9 and the cut-away portion 11. Suitable apertures 13 are formed in the end of the tongue 10 and in the body of the other end of the strip or band beyond the cut-away portion 11 to receive a flattened rivet 14, by means of which the two ends of the band or strip are partly united. As a further means for uniting these ends and insuring a permanent and rigid joint I braze together the under margins of the tongue 10 and the upper surfaces of the flanges 11, as indicated at 15. This brazing completes the production of a permanent and substantially-rigid joint.

A tire constructed in accordance with my invention presents the following advantages: The central part of that portion of the rubber which lies between the retaining-band and the metallic rim presents a large mass of rubber, which when radial pressure is brought upon the rubber tire proper receives a direct and continuous pressure from the entire concave under surface of the retaining-band. This pressure tends to force this portion of the rubber downward and outward, and the rubber is thus compressed at the points lying immediately between the enlarged or beaded edges of the retaining-band and the metallic rim. By this means the cutting of the rubber which ordinarily occurs at these two points is very largely diminished and the durability and life of the tire are considerably increased. The marginal enlargements or beads are in themselves a preventive of such cutting by reason of the extended bearing-surfaces which they present in all directions. The continuous bearing of the body portion of the band and its concavity on its under face, taken in conjunction with the comparatively-large convex mass of rubber lying between it and the rim, insure the interposition of a proper amount of rubber and the proper compression of the same between the beads 9 and the metallic rim.

With regard to the above mode of fastening the ends of the retaining-bands the longitudinal strains, which tend to separate said ends in the direction of the length of the bands, are chiefly resisted by the rivet 14, which is well calculated to withstand the strain. The brazing of the edges of the tongue and of the lateral flanges serves to prevent any lateral movement of these parts relative to each other, thus making the joint laterally rigid, holding the two ends of the band in line with each other, and preventing wear of the rivet and cutting of the tire. This lateral rigidity is also furthered by the bearing of the lateral edges of the tongue against the beads or enlargements of the other end of the band.

It will be understood, of course, that the tire proper is applied to the rim in the usual manner, the retaining-band being first inserted through the rubber, and this latter being then compressed thereon, so as to leave the ends of the band exposed. The tire being placed in the rim, the exposed ends are joined by riveting and brazing, and the rubber is then released from compression, whereupon its ends will meet and cover and protect the joint, being united by cement or in any other suitable manner.

The details of construction may obviously be varied—as, for instance, by the employment of two or more rivets or the omission of the cut-away portion 11—and I therefore do not wish to be understood as limiting myself to the exact details set forth.

I claim—

1. The combination with a channeled rim having inclined side walls, of a rubber tire fashioned to fit the channel and having in its inner portion within the rim, a longitudinal passage having outwardly-arched upper and lower walls with a tubular passage at each edge thereof, and a metallic retaining-band fashioned to fit the passage and having beaded edges fitting in the tubular edge passages, substantially as set forth.

2. The combination, with a channeled metallic rim and a rubber tire seated therein, of a retaining band or strip having beaded edges, said edges being cut away at one end to form a tongue and the body of the strip being centrally cut away at the other end to form lateral flanges extending inward from the beaded edges, said tongue being united to said other end by riveting beyond the cut-away portion thereof, and by brazing between its lateral edges and the inwardly-extending lateral flanges of said other end, which flanges the edges of the tongue overlap, substantially as described.

HARVEY S. FIRESTONE.

Witnesses:
IRVINE MILLER,
FREDERICK C. GOODWIN.